US009426564B2

(12) United States Patent
Mitsufuji et al.

(10) Patent No.: US 9,426,564 B2
(45) Date of Patent: Aug. 23, 2016

(54) AUDIO PROCESSING DEVICE, METHOD AND PROGRAM

(71) Applicants: SONY CORPORATION, Minato-ku (JP); Institut de Recherche et Coord. Acoustique/Musique, Paris (FR)

(72) Inventors: Yuhki Mitsufuji, Tokyo (JP); Axel Roebel, Paris (FR)

(73) Assignees: SONY CORPORATION, Minato-ku (JP); Institut de Recherche et Coordination Acoustique/Musique, Paris (FR)

( * ) Notice: Subject to any disclaimer, the term of this patent is extended or adjusted under 35 U.S.C. 154(b) by 275 days.

(21) Appl. No.: 14/072,050

(22) Filed: Nov. 5, 2013

(65) Prior Publication Data

US 2014/0133674 A1    May 15, 2014

(30) Foreign Application Priority Data

Nov. 13, 2012    (EP) .................................... 12306403

(51) Int. Cl.
| | |
|---|---|
| H04R 3/00 | (2006.01) |
| H04S 7/00 | (2006.01) |
| G10L 21/0208 | (2013.01) |
| G10L 21/0216 | (2013.01) |
| G06F 17/30 | (2006.01) |
| H04R 1/02 | (2006.01) |

(52) U.S. Cl.
CPC ........... *H04R 3/00* (2013.01); *H04S 7/302* (2013.01); *G06F 17/30592* (2013.01); *G10L 21/0208* (2013.01); *G10L 2021/02166* (2013.01); *H04R 1/028* (2013.01); *H04S 2400/15* (2013.01)

(58) Field of Classification Search
CPC combination set(s) only.
See application file for complete search history.

(56) References Cited

U.S. PATENT DOCUMENTS

| | | | |
|---|---|---|---|
| 2005/0222840 A1* | 10/2005 | Smaragdis ........... | G10L 21/0272 704/204 |
| 2007/0112818 A1* | 5/2007 | Sastry ............... | G06F 17/30421 |
| 2008/0298597 A1 | 12/2008 | Turku et al. | |
| 2010/0138010 A1* | 6/2010 | Aziz Sbai et al. .... | G10H 1/0008 700/94 |
| 2011/0054848 A1 | 3/2011 | Kim et al. | |
| 2011/0081024 A1 | 4/2011 | Soulodre | |

OTHER PUBLICATIONS

Fevotte et al, Notes on nonnegative tensor factorization of the spectrogram for audio separation statistical insight and towards self clusteing of the spatial cues, 2011.*
Fitzgerald et al, Non negative tensor factorization for sound source separation, ISSC 2005.*
Lee et al, Beamspace Domain multichannel nonnegative matrix factorization for audio sources separation, IEEE Jan. 2012.*

(Continued)

*Primary Examiner* — Davetta W Goins
*Assistant Examiner* — Kuassi Ganmavo
(74) *Attorney, Agent, or Firm* — Oblon, McClelland, Maier & Neustadt, L.L.P

(57) ABSTRACT

An audio processing device including a factorization unit which factorizes frequency information obtained by performing time-frequency transformation on an audio signal of a plurality of channels into a channel matrix representing characteristics of a channel direction, a frequency matrix representing characteristics of a frequency direction, and a time matrix representing characteristics of a time direction; and an extraction unit which extracts the frequency information of audio from an arbitrary designated direction based on the channel matrix, the frequency matrix, and the time matrix.

8 Claims, 9 Drawing Sheets

(56) References Cited

OTHER PUBLICATIONS

Sawada et al, Multichannel extensions of nonnegative matrix factorization with complex valued data, IEEE.*
European Search Report issued Mar. 22, 2013, in European Application No. 12306403.2 filed Nov. 13, 2012.
J. Nikunen, et al., "Multichannel Audio Upmixing Based on Non-Negative Tensor Factorization Representation", 2011 IEEE Workshop on Applications of Signal Processing to Audio and Acoustics (WASPAA), Oct. 16-19, 2011, 4 pages.
Alexey Ozerov, et al., "Multichannel Nonnegative Tensor Factorization With Structured Constraints for User-Guided Audio Source Separation", 2011 IEEE International Conference on Acoustics, Speech and Signal Processing (ICASSP), May 22, 2011, 4 pages.
A, et al., "Nonnegative Matrix and Tensor Factorizations—Applications to Exploratory Multi-way Data Analysis and Blind Source Separation", http://www.bsp.brain.riken.jp/~cia/recent.html (retrieved Mar. 14, 2013), Sep. 1, 2009, 2 pages.

* cited by examiner

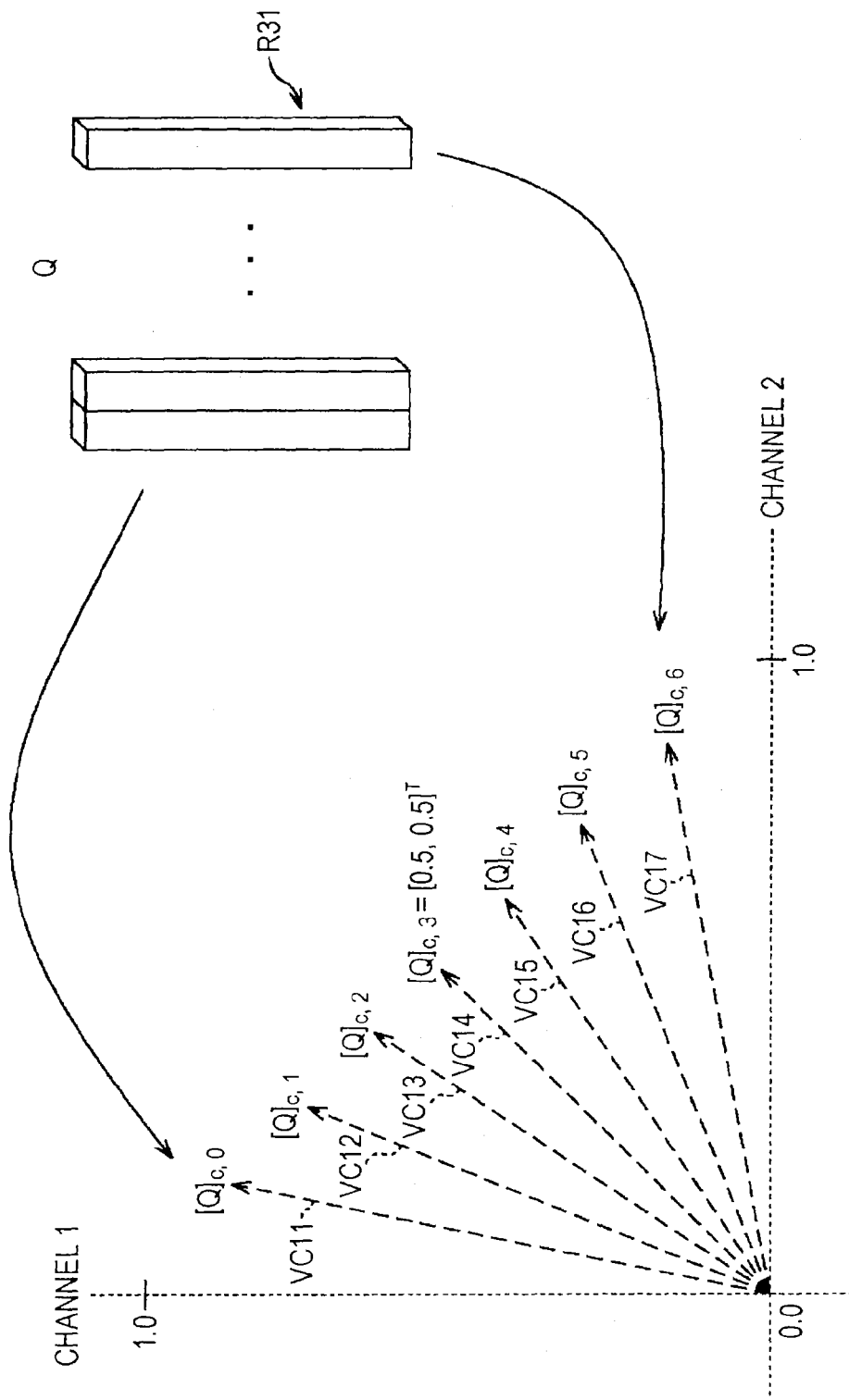

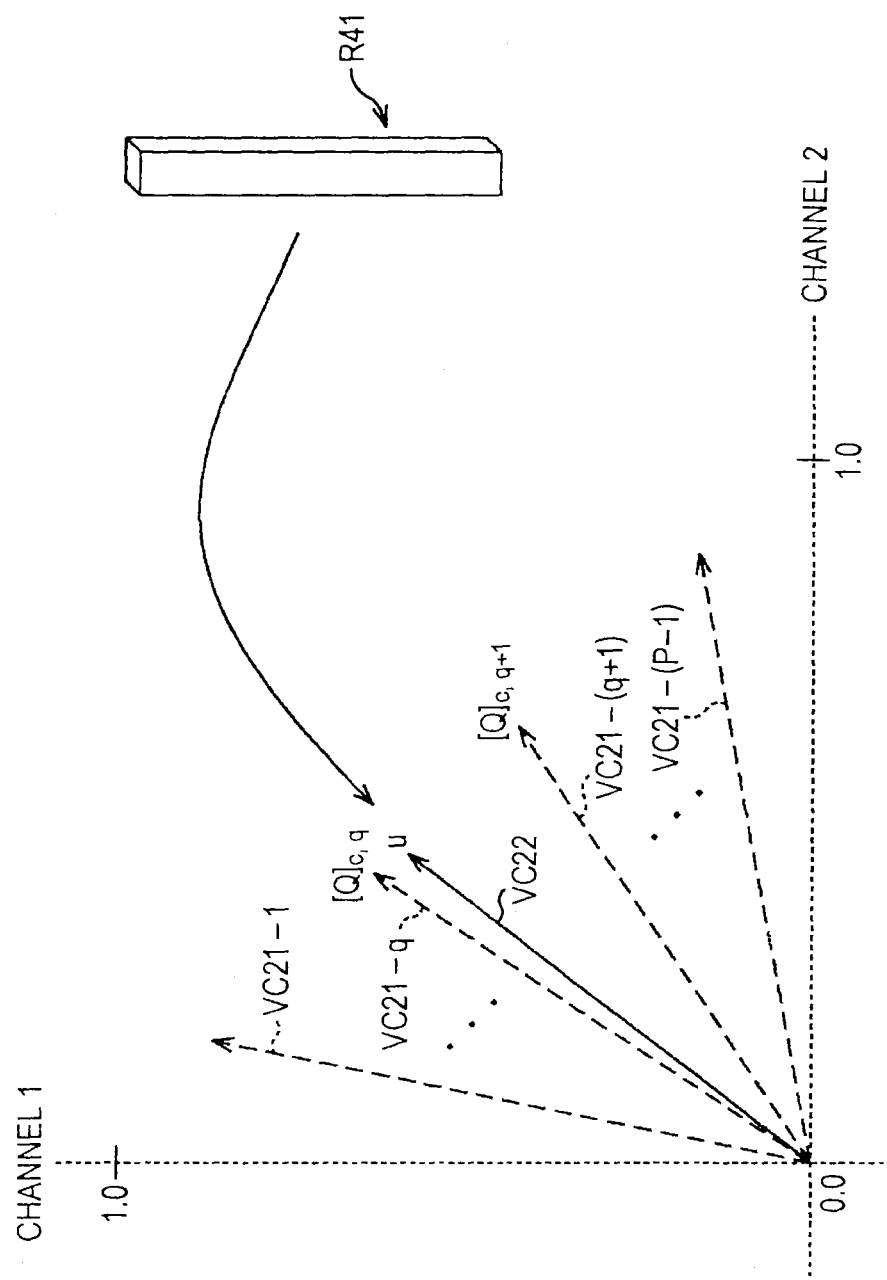

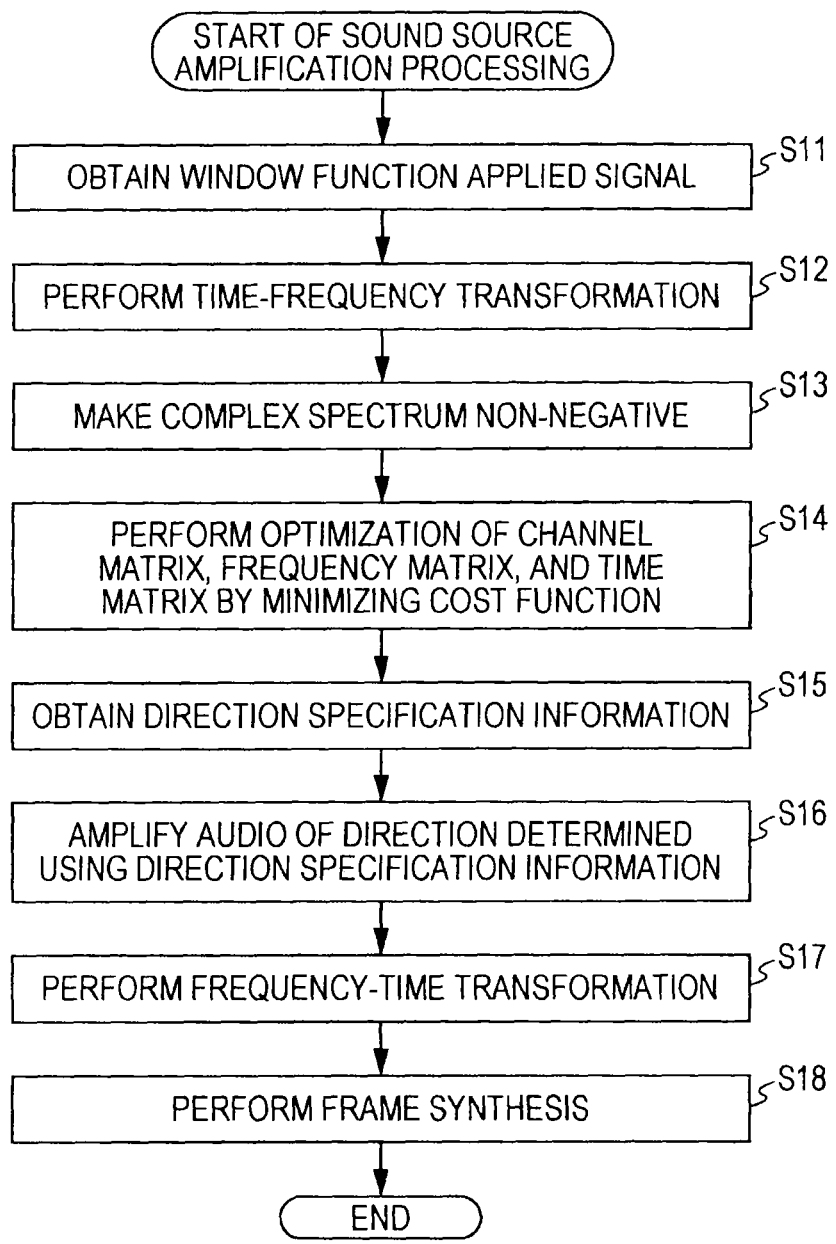

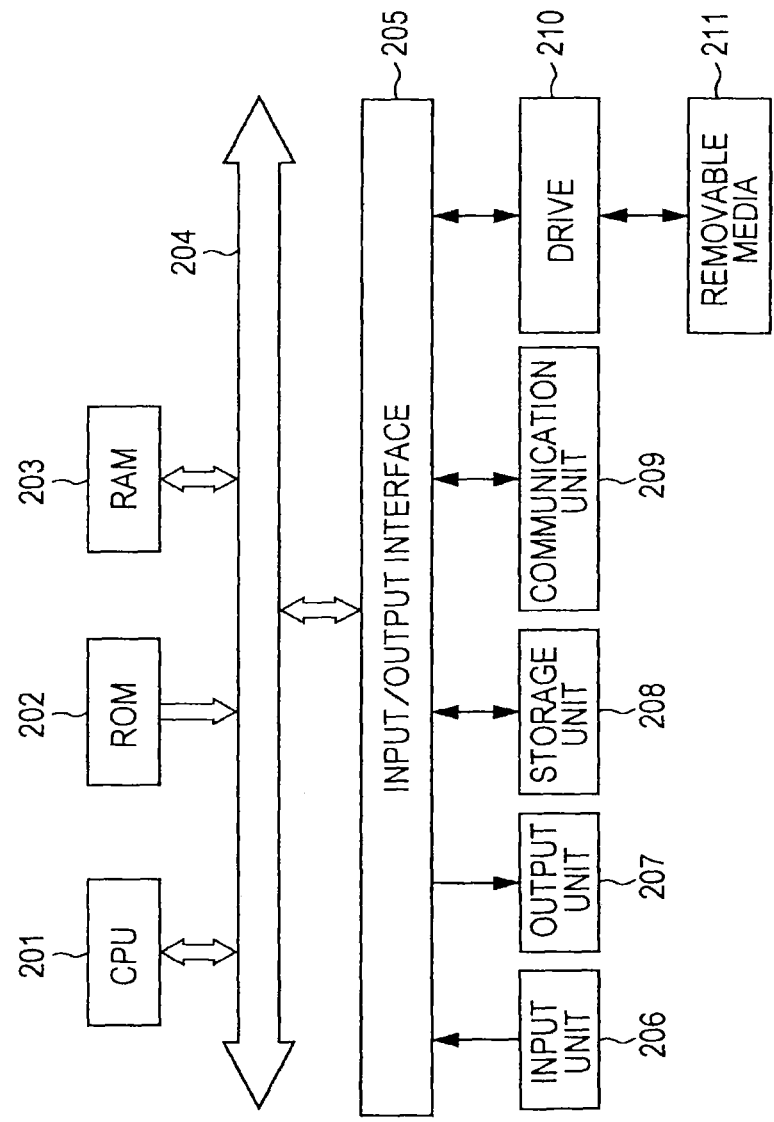

AUDIO PROCESSING DEVICE, METHOD AND PROGRAM

BACKGROUND

The present technology relates to an audio processing device, method and program, in particular to an audio processing device, method and program which are able to more easily extract audio from a sound source in a desired direction.

A technology of the related art may separate the audio output from a plurality of sound sources into audio of the respective sound sources. For example, a method has been proposed which realizes high sound source separation ability even in environments having noise influence by separating one or more sound source signals from a plurality of mixed audio signals and further subjecting them to a binary masking process using sound source separation processing based on the independent component analysis method (for example, refer to Japanese Unexamined Patent Application Publication No. 2006-154314).

SUMMARY

However, in the above described technology, it is possible to separate the audio of a predetermined sound source from the audio of a plurality of sound sources, however, it may not be possible to extract the audio from an arbitrary direction, in other words, the audio from a sound source in a desired direction.

It is desirable to provide an audio processing device, method and program which are able to more easily extract audio from a sound source in a desired direction.

An audio processing device according to an embodiment of the present technology includes a factorization unit which factorizes frequency information obtained by performing time-frequency transformation on an audio signal from a plurality of channels into a channel matrix representing characteristics of a channel direction, a frequency matrix representing characteristics of a frequency direction, and a time matrix representing characteristics of a time direction; and an extraction unit which extracts the frequency information of audio from an arbitrary designated direction based on the channel matrix, the frequency matrix, and the time matrix.

The audio processing device may further include a direction specification unit which obtains direction specification information specifying a matrix component relating to audio from the designated direction based on direction information and the channel matrix representing the designated direction; in which the extraction unit extracts the frequency information of audio from the designated direction based on the channel matrix, the frequency matrix, as well as the time matrix and the direction specification information.

The extraction unit may extract the frequency information of audio from the designated direction by amplifying the frequency information by an amplification factor determined using the direction specification information.

The extraction unit may change the amplification factor based on statistical characteristics of the frequency matrix or the time matrix.

The factorization unit assumes that the frequency information is a three-dimensional tensor where a channel, a frequency, and a time frame are the respective dimensions, and may factorize the frequency information into the channel matrix, the frequency matrix, and the time matrix by performing tensor factorization.

The tensor factorization may be a non-negative tensor factorization.

The audio processing device may further include a frequency-time transform unit which generates an audio signal from a plurality of channels by performing frequency-time transformation on the frequency information of audio from the designated direction obtained by the extraction unit.

According to an embodiment of the present technology, there is provided an audio processing method or program including factorizing frequency information obtained by performing time-frequency transformation on an audio signal from a plurality of channels into a channel matrix representing characteristics of a channel direction, a frequency matrix representing characteristics of a frequency direction, and a time matrix representing characteristics of a time direction; and extracting the frequency information of audio from an arbitrary designated direction based on the channel matrix, the frequency matrix, and the time matrix.

According to an embodiment of the present technology, frequency information obtained by performing time-frequency transformation on an audio signal from a plurality of channels is factorized into a channel matrix representing characteristics of a channel direction, a frequency matrix representing characteristics of a frequency direction, and a time matrix representing characteristics of a time direction; and the frequency information of audio from an arbitrary designated direction based on the channel matrix, the frequency matrix, and the time matrix is extracted.

According to an embodiment of the present technology, it is possible to more easily extract audio from a sound source in a desired direction.

BRIEF DESCRIPTION OF THE DRAWINGS

FIG. 6 is a view illustrating a channel matrix;

FIG. 7 is a view illustrating the specification of the designated direction;

FIG. 8 is a flowchart illustrating the sound source amplification processing; and FIG. 9 is a view showing an example of the configuration of a computer.

DETAILED DESCRIPTION OF EMBODIMENTS

Embodiments of the present technology will be described below with reference to the figures.

Configuration Example of Spectacle-Type Apparatus

The present technology relates to a direction designated sound source extraction device which extracts audio from a sound source in a desired direction from the audio from a plurality of sound sources.

Hereinafter, description will be given regarding the direction designated audio amplifier provided in an inner portion of the spectacle-type apparatus as an example of the direction designated sound source extraction device. The direction designated audio amplifier is realized using an application program which amplifies only the audio of an arbitrary direction which a user designates. Furthermore, attenuation of the audio is realized by a negative amplification factor.

Figure 1:
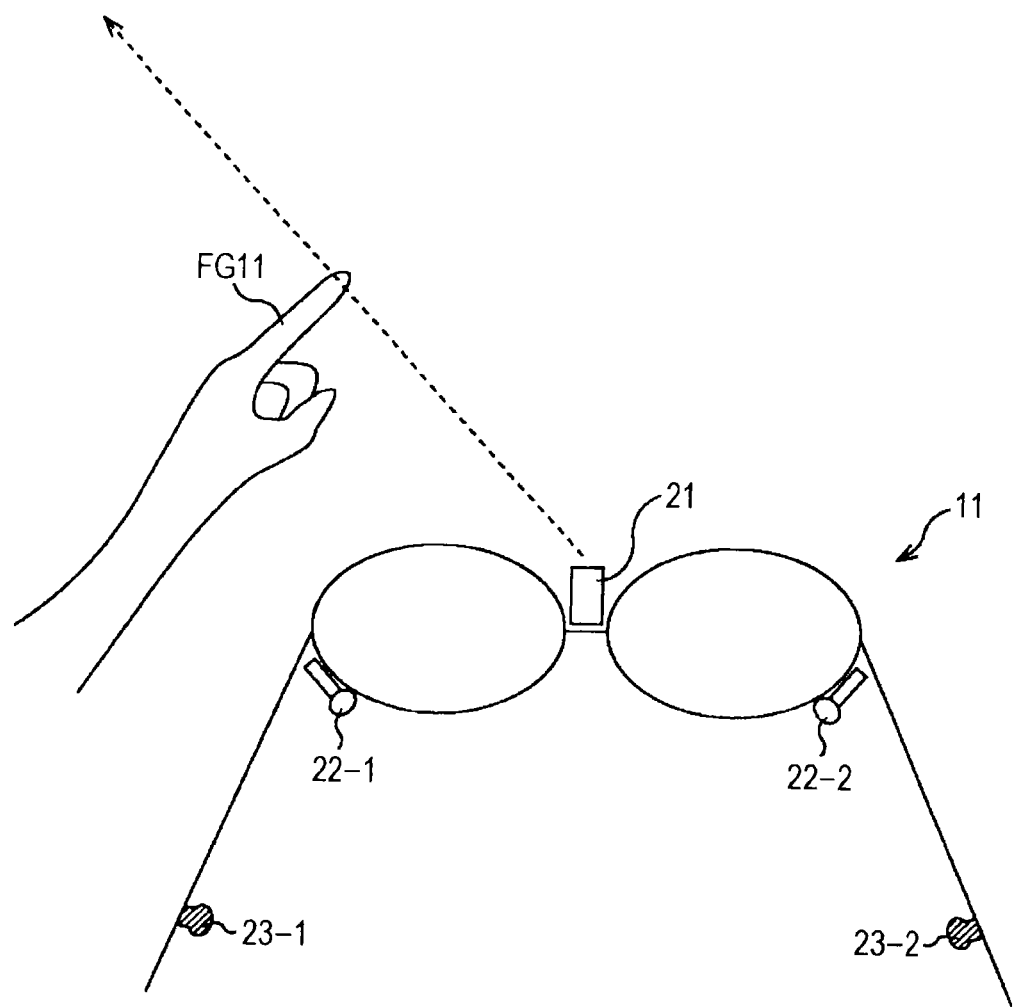
FIG. 1 is a view showing an example of the configuration of the appearance of a spectacle-type apparatus.

The appearance of a spectacle-type apparatus with a built-in direction designated audio amplifier is configured, for example, as shown in FIG. 1. In other words, there is provided a spectacle-type apparatus 11, a camera 21, a microphone 22-1, a microphone 22-2, an earphone 23-1, and an earphone 23-2.

In the spectacle-type apparatus 11, the camera 21 is provided in the center of the spectacles, and the left channel microphone 22-1 and the right channel microphone 22-2 are provided respectively in the vicinity of the left and right lenses. In addition, the left channel earphone 23-1 and the right channel earphone 23-2 are provided respectively on the left and right temple portions of the spectacle-type apparatus 11.

Furthermore, hereinafter, when there is no particular reason to distinguish between the microphone 22-1 and the microphone 22-2, they will simply be referred to as the microphones 22, and when there is no particular reason to distinguish between the earphone 23-1 and the earphone 23-2, they will simply be referred to as the earphones 23. In addition, there are a total of two of the microphones 22 provided in the spectacle-type apparatus 11, however, three or more microphones 22 may also be provided. Similarly, three or more of the earphones 23 may also be provided.

In the spectacle-type apparatus 11, peripheral audio is collected by the monaural microphones 22 provided on the left and right, the audio signal obtained thereby is submitted to acoustic treatment, and the audio of a direction designated by the user is amplified. Furthermore, the audio signal which has been amplification processed is supplied to the earphones 23, and audio is output from the earphones 23.

Here, when designating the direction of the audio to amplify, for example, the user holds out the index finger FG11 of their left hand and designates the sound source direction of the audio to be extracted.

Since the camera 21 provided in the center of the spectacles of the spectacle-type apparatus 11 images the image in front of the user wearing the spectacle-type apparatus 11, the index finger FG11 appears on the image imaged by the camera 21. Then, the spectacle-type apparatus 11 detects the index finger FG11 from the image imaged by the camera 21 and specifies the direction designated by the user, based on the detection results. In the spectacle-type apparatus 11, only the audio from the direction which is specified in this manner is amplified and reproduced.

Furthermore, the detection of the index finger FG11 on the image is performed by, for example, object detection using feature values, or the like, however, the specification method of a direction designated by the user may be any manner of method. For example, the designated direction may be specified by the user wearing a predetermined finger stall on the index finger FG11 and the finger stall being detected, and may also be specified by the user directly inputting the direction to designate.

Furthermore, here, as an application example of the present technology, an application program which amplifies only the audio of the direction designated by the user will be described, however, the present technology may also be applied to, for example, musical instrument extraction, sound source separation with facial recognition, and the like. Musical instrument extraction is an application program which designates a specific musical instrument in a situation in which musical instrument map information showing the three-dimensional arrangement of musical instruments beforehand may be obtained, and extracts the audio signal of only a specific musical instrument using sound source separation with prior information. In addition, sound source separation with facial recognition is an application program which specifies the direction in which a plurality of humans are present using facial recognition, and separates the voices of each human using the directional information and the general characteristics of the human voice.

Configuration Example of Direction Designated Audio Amplifier

Figure 2:
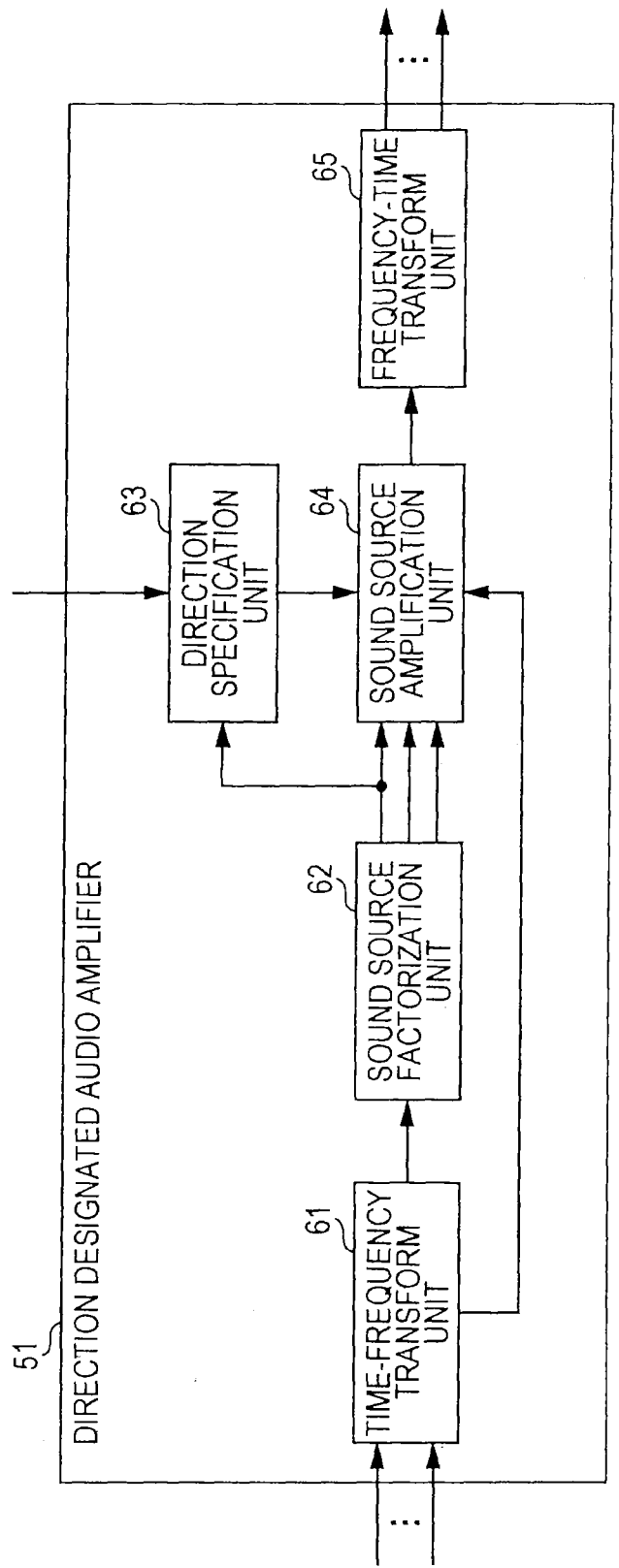
FIG. 2 is a view showing an example of the configuration of a direction designated audio amplifier.

Next, description will be given regarding the direction designated audio amplifier provided in an inner portion of the spectacle-type apparatus 11 shown in FIG. 1. FIG. 2 is a view showing an example of the configuration of a direction designated audio amplifier.

The direction designated audio amplifier 51 is formed from a time-frequency transform unit 61, a sound source factorization unit 62, a direction specification unit 63, a sound source amplification unit 64, and a frequency-time transform unit 65.

In the time-frequency transform unit 61, the audio signal of a plurality of channels collected by the microphones 22 is supplied as a multichannel input signal. The time-frequency transform unit 61 performs time-frequency transformation on the supplied multichannel input signal and supplies the input complex spectrum which was obtained as a result to the sound source amplification unit 64, in addition to supplying a non-negative spectrogram, formed from a non-negative spectrum obtained by making an input complex spectrum non-negative, to the sound source factorization unit 62.

The sound source factorization unit 62 assumes that the non-negative spectrogram supplied from the time-frequency transform unit 61 is a three-dimensional tensor, in which the dimensions are the channel, the frequency, and the time frame, and performs Non-negative Tensor Factorization (NTF). The sound source factorization unit 62 supplies the channel matrix Q, the frequency matrix W, and the time matrix H obtained using the non-negative tensor factorization to the sound source amplification unit 64, in addition to supplying the channel matrix Q to the direction specification unit 63.

The directional information u, which shows the direction which was designated by the user and obtained based on the image imaged by the camera 21, in other words, the direction of the sound source to be amplified (hereinafter also referred to as the designated direction), is supplied to the direction specification unit 63. Based on the supplied direction information u and the channel matrix Q from the sound source factorization unit 62, the direction specification unit 63 obtains the direction specification information q, which specifies a matrix component relating to the audio, from the designated direction which is contained in the matrix obtained from the non-negative spectrum and supplies the direction specification information q to the sound source amplification unit 64.

Based on the input complex spectrum from the time-frequency transform unit 61, the channel matrix Q from the sound source factorization unit 62, the frequency matrix W, and the time matrix H, as well as the direction specification information q from the direction specification unit 63, the sound source amplification unit 64 generates an output time-frequency spectrum in which the audio from the designated direction is amplified and supplies the output time-frequency spectrum to the frequency-time transform unit 65. In other words, in the sound source amplification unit 64, the factorized tensor component specified by the direction specification information q is selected, an amplification factor corresponding to the selection result is multiplied by each tensor component, and amplification of the amplitude of the audio component from a designated direction on the spectrogram is performed.

The frequency-time transform unit 65 generates an amplified multichannel output signal and outputs the amplified multichannel output signal to the earphones 23 by performing an Overlap-Add on the obtained time signal after performing frequency-time transformation on the output time-frequency spectrum supplied from the sound source amplification unit 64.

Relating to Time-Frequency Transform Unit

Next, each portion of the direction designated audio amplifier 51 of FIG. 2 will be described in more detail. First, description will be given of the time-frequency transform unit 61.

The time-frequency transform unit 61 analyses the time-frequency information of the multichannel input signal x(c, t) supplied from the microphones 22. In other words, the time-frequency transform unit 61 performs time frame division of a static size on the multichannel input signal x(c, t), multiplies the multichannel frame signal x'(c, n, l) which was obtained as a result with a window function $W_{ana}$ (n), and obtains a window function applied signal wx(c, n, l).

Here, c and t in the multichannel input signal x(c, t) refer to the channel index and the time, respectively.

In addition, c, n, and l in the multichannel frame signal x'(c, n, l), and the window function applied signal wx(c, n, l) refer to the channel index, the time index, and the time frame index, respectively.

In other words, the channel index c shows which channel the signal is of, such as the left channel or the right channel, and is c=0, . . . , C−1. In addition, the time index n shows what number sample within the time frame the multichannel frame signal x'(c, n, l) is, and n=0, . . . , N−1. The time frame index l shows what number time frame the multichannel frame signal x'(c, n, l) is, and l=0, . . . , L−1. Furthermore, C is the total number of channels, N is the frame size, in other words, the number of samples within one frame, and L is the total number of time frames.

More specifically, the time-frequency transform unit 61 calculates the window function applied signal wx(c, n, l) from the multichannel frame signal x'(c, n, l) by performing the calculation of the following Expression (1).

$$wx(c,n,l) = W_{ana}(n) \times x'(c,n,l) \quad (1)$$

In addition, the window function $w_{ana}(n)$ used in the operation of Expression (1) is, for example, a function such as that shown in the following Expression (2).

$$W_{ana}(n) = \left(0.5 - 0.5 \times \cos\left(2\pi \frac{n}{N}\right)\right)^{0.5} \quad (2)$$

Furthermore, here, the window function $w_{ana}(n)$ is the square root of a Hanning window, however other windows such as the Hanning window or the Blackman Harris window may also be used as the window function.

In addition, the frame size N is, for example, a number of samples equivalent to that of 0.02 sec, in other words, N=r (sampling frequency fs×0.02), however, may also be another size. Furthermore, r( ) is an arbitrary rounding function, and here, for example, is the maximal rounding system. Furthermore, the shift amount of the frame is not limited to 50% of the frame size N, and may be any value.

When the window function applied signal wx(c, n, l) is obtained in this manner, the time-frequency transform unit 61 performs time-frequency transformation on the window function applied signal wx(c, n, l) and obtains an input complex spectrum X(c, k, l). In other words, the calculation of the following Expression (3) is performed, and the input complex spectrum X(c, k, l) is calculated using a discrete Fourier transform (DFT).

$$X(c, k, l) = \sum_{m=0}^{M-1} wx'(c, m, l) \times \exp\left(-j2\pi \frac{k \times m}{M}\right) \quad (3)$$

Furthermore, in Expression (3), j represents a purely imaginary number, and M represents the number of points used in the time-frequency transformation. For example, the number of points M is the frame size N or greater, and is a value such as an exponent of 2 which is closest to N, however, may also be another number. In addition, in Expression (3), k represents a frequency index for specifying the frequency, and frequency index k=0, . . . , K−1. Furthermore, K=M/2+1.

Furthermore, in Expression (3), wx'(c, m, l) is a zero-padded signal and is represented by the following Expression (4). In other words, in the time-frequency transformation, the zero-padding is performed corresponding to the number of points M of the discrete Fourier transform according to necessity.

$$wx'(c, m, l) = \begin{cases} wx(c, m, l) & m = 0, \ldots, N-1 \\ 0 & m = N, \ldots, M-1 \end{cases} \quad (4)$$

Furthermore, here, an explanation has been given of an example of performing the time-frequency transformation using a discrete Fourier transform, however, other time-frequency transformations, such as discrete cosine transform (DCT), or modified discrete cosine transform (MDCT), may also be performed.

When the time-frequency transform unit 61 calculates the input complex spectrum X(c, k, l) by performing time-frequency transformation for each time frame of the multichannel input signal x(c, t), the time-frequency transform unit 61 concatenates the input complex spectra X(c, k, l) which span a plurality of frames of the same channel, and configures a matrix.

Figure 3:
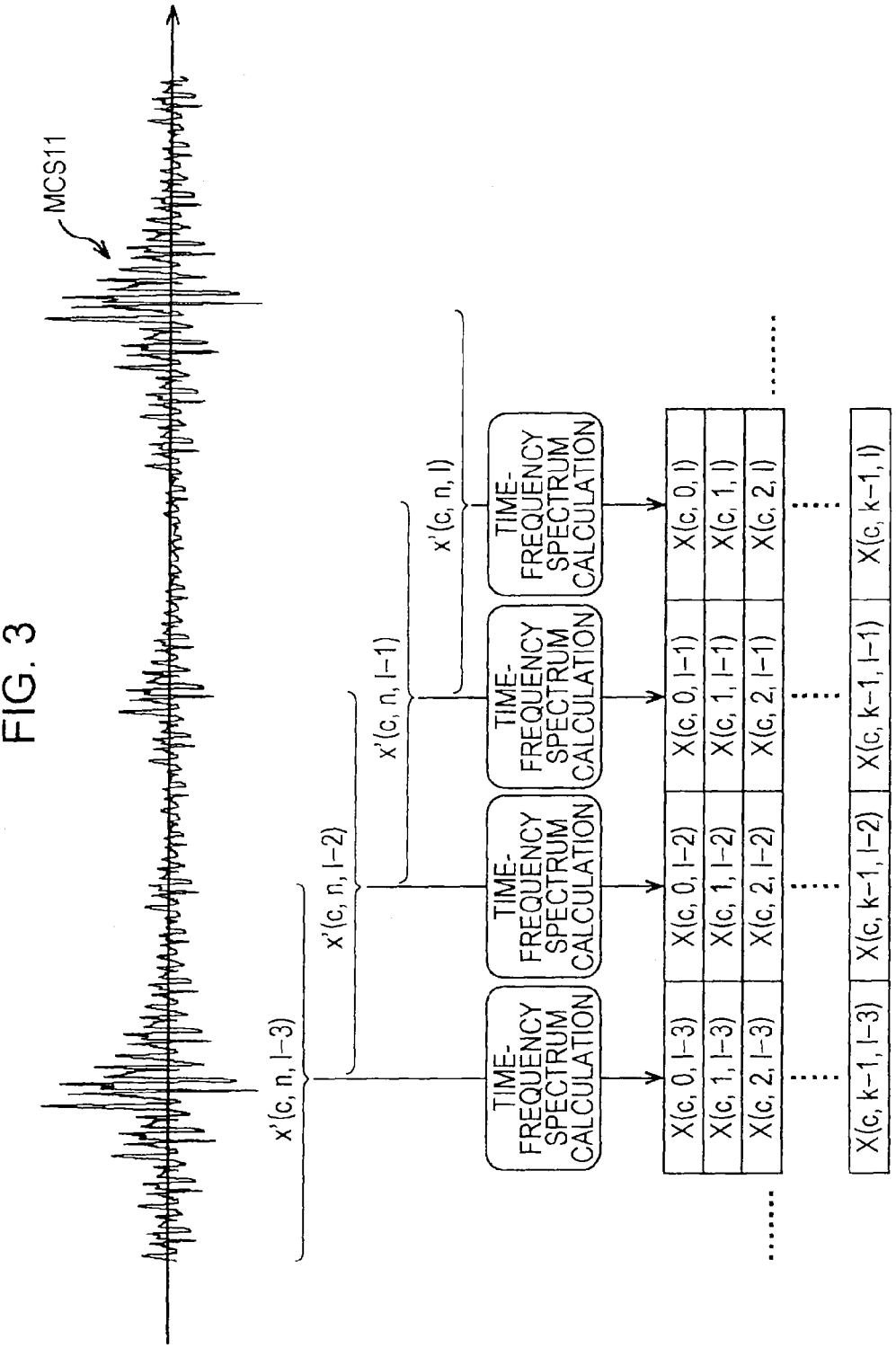
FIG. 3 is a view illustrating an input complex spectrum.

Accordingly, for example, the matrix shown in FIG. 3 is obtained. In FIG. 3, time-frequency transformation is being performed in relation to the four multichannel frame signals, multichannel frame signal x'(c, n, l−3) to multichannel frame signal x'(c, n, l) which are adjacent to each other in the multichannel input signal x(c, t) of one channel represented by the arrow MCS11.

Furthermore, the vertical direction and horizontal direction of the multichannel input signal x(c, t) represented by the arrow MCS11 represent the amplitude and the time, respectively.

In FIG. 3, one rectangle represents one input complex spectrum, for example, K input complex spectra, input complex spectrum X(c, 0, l−3) to input complex spectrum X(c, K−1, l−3), are obtained using time-frequency transformation in relation to the multichannel frame signal x'(c, n, l−3).

When input complex spectra in relation to each time frame are obtained in this manner, the input complex spectra are concatenated into a single matrix. Furthermore, the input complex spectrogram X shown in FIG. 4 is obtained by further concatenating the matrices obtained for each of C channels.

Furthermore, in FIG. 4, the same reference numerals will be given to portions corresponding to those in the case of FIG. 3, and a description thereof will be omitted.

Figure 4:
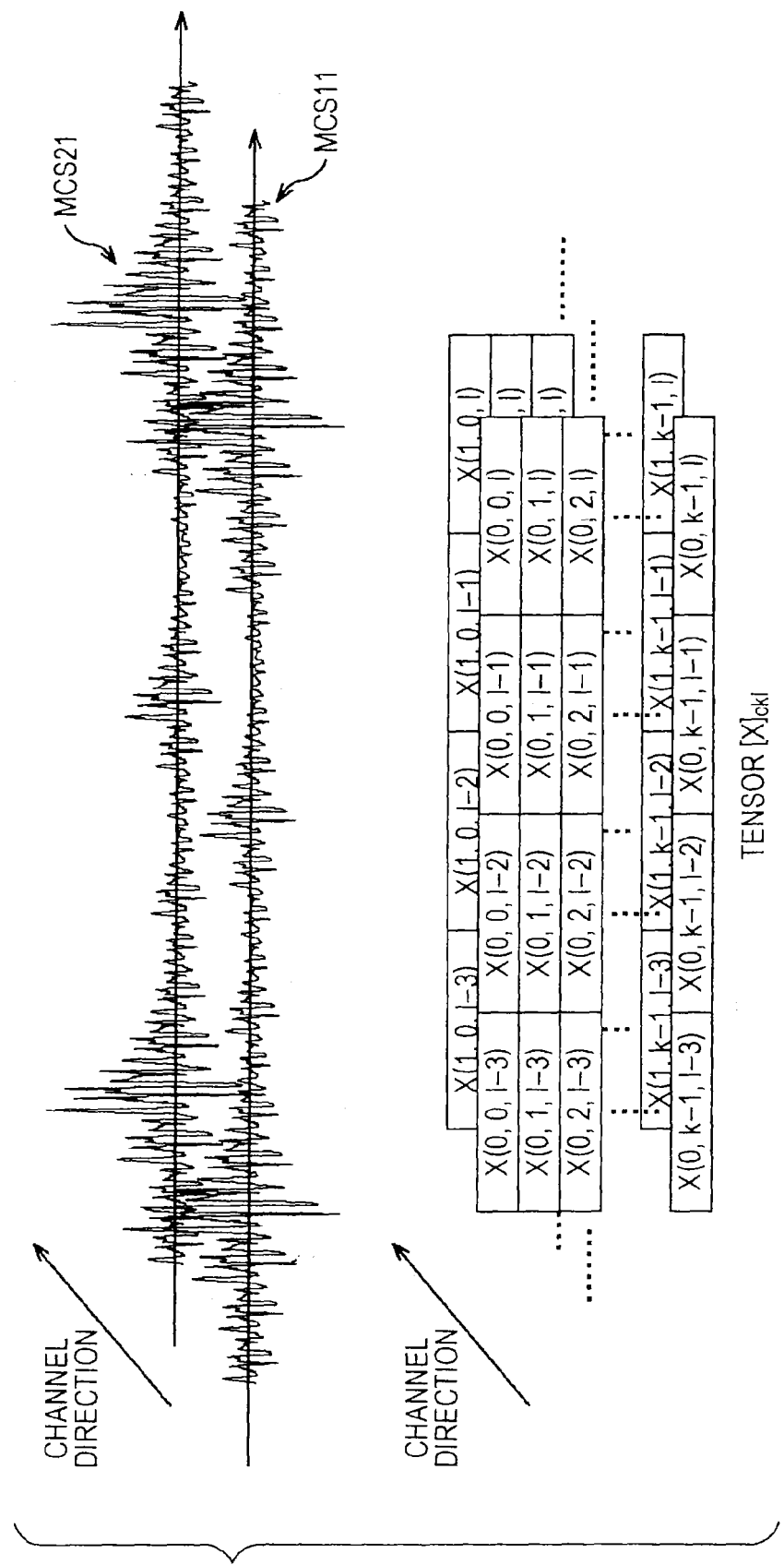
FIG. 4 is a view illustrating an input complex spectrogram.

In FIG. 4, the multichannel input signal x(c, t) represented by the arrow MCS21 represents a different multichannel input signal to the multichannel input signal x(c, t) represented by the arrow MCS11, and in this example, the total number of channels C=2.

In addition, in FIG. 4, one rectangle represents one input complex spectrum, each input complex spectrum in the figure is arranged and concatenated in the vertical direction, the horizontal direction, and the depth direction, in other words, in the frequency direction, the time direction, and the channel direction to form an input complex spectrum X in a three-dimensional tensor representation.

Furthermore, hereinafter when representing each element of the input complex spectrum X, they will be represented as $[X]_{ckl}$, or $x_{ckl}$.

In addition, the time-frequency transform unit 61 calculates a non-negative spectrum G(c, k, l) by performing the calculation of the following Expression (5) and making each of the input complex spectra X(c, k, l), which were obtained using time-frequency transformation, non-negative.

$$G(c,k,l)=(X(c,k,l)\times \mathrm{conj}(X(c,k,l)))^\gamma \qquad (5)$$

Furthermore, in Expression (5), conj(X(c, k, l)) represents a complex conjugate of the input complex spectrum X(c, k, l), and γ represents a non-negative control value. For example, the non-negative control value γ may be any value, however, when γ=1, the non-negative spectrum is a power spectrum, and when γ=½, the non-negative spectrum is an amplitude spectrum.

The non-negative spectra G(c, k, l) obtained using the calculation of Expression (5) are conjugated in the channel direction, the frequency direction and the time frame direction, are the non-negative spectrogram G which is supplied from the time-frequency transform unit 61 to the sound source factorization unit 62.

Relating to Sound Source Factorization Unit

Next, the sound source factorization unit 62 will be described.

The sound source factorization unit 62 treats the non-negative spectrogram G as a three-dimensional tensor of C×K×L, and separates the non-negative spectrogram G into P three-dimensional tensors $\hat{G}_P$ (hereinafter, referred to as the base spectrogram). Here, p represents a base index which represents the base spectrogram, and where the base number is P, p=0, . . . , P−1.

Furthermore, since the P base spectrograms $\hat{G}_P$ may express the outer product of three vectors, they are respectively factorized into three vectors. Accordingly, as a result of collecting P vectors of each of the three types, three new matrices, in other words, the channel matrix Q, the frequency matrix W, and the time matrix H, may be obtained, therefore the non-negative spectrogram G could be said to be possible to factorize into three matrices. Furthermore, the size of the channel matrix Q is C×P, the size of the frequency matrix W is K×P, and the size of the time matrix H is L×P.

Furthermore, hereinafter when representing each element of the three-dimensional tensor or the matrix, they will be represented as $[G]_{ckl}$, or $g_{ckl}$. In addition, when a specific dimension is designated and all of the elements of the remaining dimensions are referred to, they will be represented as $[G]_{:,k,l}$ $[G]_{c,:,l}$, and $[G]_{c,k,:}$, respectively, depending on the dimension. In this example, $[G]_{ckl}$, $g_{ckl}$, $[G]_{:,k,l}$ $[G]_{c,:,l}$, and $[G]_{c,k,:}$ represent each element of the non-negative spectrogram G.

In the sound source factorization unit 62, the tensor factorization is performed by minimizing the error tensor E using non-negative tensor factorization. The necessary constraints for optimization are that there is non-negativity between the non-negative spectrogram G, the channel matrix Q, the frequency matrix W, and the time matrix H.

According to these constraints, in non-negative tensor factorization, unlike in tensor factorization methods of the related art such as PARAFAC or Tucker factorization, it is possible to extract the inherent characteristics which the sound source has. In addition, non-negative tensor factorization is also a generalization of the tensor of a Non-negative Matrix Factorization (NMF).

The channel matrix Q, the frequency matrix W, and the time matrix H obtained using tensor factorization each have inherent characteristics.

Here, description will be given of the channel matrix Q, the frequency matrix W, and the time matrix H.

Figure 5:
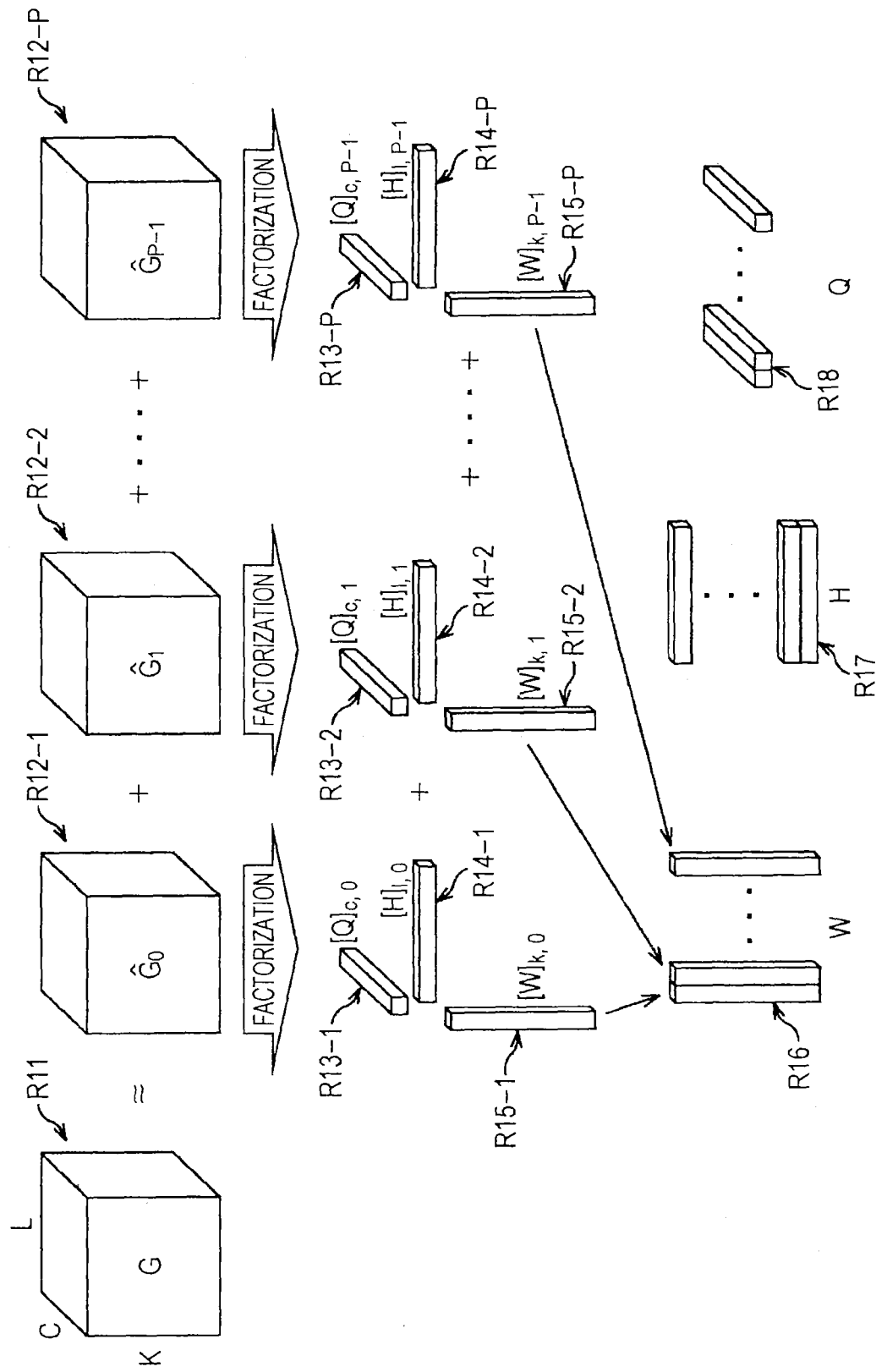
FIG. 5 is a view illustrating a tensor factorization.

For example, as shown in FIG. 5, as a result of factorizing the three-dimensional tensor, which is obtained by subtracting the error tensor E from the non-negative spectrogram G represented by the arrow R11, into the base number P, the base spectrogram $\hat{G}_0$ to the base spectrogram $\hat{G}_{P-1}$ represented by the arrow R12-1 to the arrow R12-P are obtained.

Each of the base spectrograms $\hat{G}_P$ (where 0≤p≤P−1), in other words, the three-dimensional tensor $\hat{G}_P$ described above, may respectively be represented by an outer product of the three vectors.

For example, the base spectrogram $\hat{G}_0$ may be represented by the outer product of the three vectors of, the vector $[Q]_{c,0}$ represented by the arrow R13-1, the vector $[H]_{l,0}$ represented by the arrow R14-1, and the vector $[W]_{k,0}$ represented by the arrow R15-1.

The vector $[Q]_{c,0}$ is a column vector formed from a total number of channels C elements, and the sum of the values of each of the C elements is 1. Each of the C elements of the vector $[Q]_{c,0}$ is a component which corresponds to each channel represented by the channel index c.

The vector $[H]_{l,0}$ is a row vector formed from a total number of time frames L elements, and each of the L elements of the vector $[H]_{l,0}$ is a component which corresponds to each time frame represented by the time frame index l. Furthermore, the vector $[W]_{k,0}$ is a column vector formed from a number of frequency K elements, and each of the K elements of the vector $[W]_{k,0}$ is a component which corresponds to the frequency represented by the frequency index k.

The vector $[Q]_{c,0}$, the vector $[H]_{l,0}$, and the vector represent the characteristics of the channel direction of the base spectrogram $\hat{G}_0$, the characteristics of the time direction, and the characteristics of the frequency direction, respectively.

Similarly, the base spectrogram $\hat{G}_1$ may be represented by the outer product of the three vectors of, the vector $[Q]_{c,1}$ represented by the arrow R13-2, the vector $[H]_{l,1}$ represented by the arrow R14-2, and the vector $[W]_{k,1}$ represented by the arrow R15-2. In addition, the base spectrogram may be represented by the outer product of the three vectors of, the vector $[Q]_{c,P-1}$ represented by the arrow R13-P, the vector $[H]_{l,P-1}$ represented by the arrow R14-P, and the vector $[W]_{k,P-1}$ represented by the arrow R15-P.

Furthermore, the channel matrix Q, the frequency matrix W, and the time matrix H are the result of collecting, for each respective dimension, the three vectors which correspond to the three dimensions of the P base spectrograms $\hat{G}_P$ (where 0≤p≤P) and making them into a matrix.

In other words, in FIG. 5, as shown by the arrow R16 on the lower side, the matrix formed from the vector $[W]_{k,0}$ to the vector $[W]_{k,P-1}$, which are vectors which represent the characteristics of the frequency direction of each base spectrogram $\hat{G}_P$, is the frequency matrix W.

Similarly, as shown by the arrow R17, the matrix formed from the vector $[H]_{l,0}$ to the vector $[H]_{l,P-1}$, which are vectors which represent the characteristics of the time direction of each base spectrogram $\hat{G}_p$, is the time matrix H. In addition, as shown by the arrow R18, the matrix formed from the vector $[Q]_{c,0}$ to the vector $[Q]_{c,P-1}$, which are vectors which represent the characteristics of the channel direction of each base spectrogram $\hat{G}_p$, is the channel matrix Q.

It is learned that, according to the characteristics of the Non-negative Tensor Factorization (NTF), each base spectrogram $\hat{G}_p$, which is factorized into P, represents an inherent characteristic within the sound source, respectively. In the Non-negative Tensor Factorization, since all of the elements are constrained to non-negative values, only additive combinations of the base spectrograms $\hat{G}_p$ are permitted, and as a result, the combination patterns decrease and separation becomes easier due to the inherent characteristics of the sound source.

For example, it is assumed that audio from a point sound source AS1 and a point sound source AS2, which have two different types of characteristics, is mixed. For example, the audio from the point sound source AS1 is the audio of a person, and that the audio from the point sound source AS2 is the engine noise of a vehicle.

In this case, the two point sound sources have a tendency to be exhibited in different base spectrograms $\hat{G}_p$, respectively. In other words, for example, among the total base number P, r base spectrograms $\hat{G}_p$ which are arranged continuously are allocated to the sound of a person which is the first point sound source AS1, and P-r base spectrograms $\hat{G}_p$ which are arranged continuously are allocated to the engine noise of a vehicle which is the second point sound source AS2.

Therefore, it is possible to extract each point sound source and perform acoustic treatment by selecting a base index p of an arbitrary range.

Here, further description will be given of the characteristics of each matrix, the channel matrix Q, the frequency matrix W, and the time matrix H.

The channel matrix Q represents the characteristics of the channel direction of the non-negative spectrogram G. In other words, the channel matrix Q is considered to represent the degree of contribution of each of the P base spectrograms $\hat{G}_p$ to each of the total of C channels c.

For example, the total number of channels C=2, and the multichannel input signal is a two channel stereo signal. In addition, the value of the element $[Q]_{:,0}$ (vector $[Q]_{c,0}$) of the channel matrix Q, in which the base index p=0, is $[0.5, 0.5]^T$, and the value of the element $[Q]_{:,1}$ of the channel matrix Q, in which the base index p=1, is $[0.9, 0.1]^T$.

Here, in the value $[0.5, 0.5]^T$ of the element $[Q]_{:,0}$, which is a column vector, the value of the left channel and the value of the right channel are both 0.5. Similarly, in the value $[0.9, 0.1]^T$ of the element $[Q]_{:,1}$, which is a column vector, the value of the left channel is 0.9, and the value of the right channel is 0.1.

Considering the space formed from the values of the left channel and the right channel, the values of the components of the left and right channels of the element $[Q]_{:,0}$ are the same, therefore, since the same weight is applied to both the left and right channels, the sound source represented by the base spectrogram $\hat{G}_0$ is present at equal distances in relation to the channels.

Meanwhile, in the element $[Q]_{:,1}$, since the value 0.9 of the component of the left channel is greater than the value 0.1 of the component of the right channel and the weight is biased to the left channel, this shows that the sound source represented by the base spectrogram $\hat{G}_1$ is present in a position close to the left channel.

As described above, in addition to the fact that the point sound sources are learned in different base spectrograms $\hat{G}_p$, it could be considered that the channel matrix Q represents the arrangement information of each point sound source.

Here, the relationship between each element of the channel matrix Q and the direction information in a case in which the total number of channels C=2, and the base number P=7, is shown in FIG. 6. In addition, in FIG. 6, the vertical axis and the horizontal axis represent the components of the channel 1 and the channel 2. In this example, channel 1 is the left channel and channel 2 is the right channel.

For example, the vector VC11 to the vector VC17 represented by the arrows was obtained as a result of dividing the channel matrix Q represented by the arrow R31 into each of the base number P=7 elements. In this example, the vector VC11 to the vector VC17 are the element $[Q]_{c,0}$ to the element $[Q]_{c,6}$, respectively, and the element $[Q]_{c,0}$ to the element $[Q]_{c,6}$ are arranged at equal distances. In addition, the value of the element $[Q]_{c,3}$ is $[0.5, 0.5]^T$, and the element $[Q]_{c,3}$ represents the direction centrally between the axial direction of the channel 1 and the axial direction of the channel 2.

In this example, in a case where the direction of the point sound source of the target audio is the central direction of the space in which the axial direction is the channel 1 direction and the channel 2 direction, in other words, the direction of the vector represented by the element $[Q]_{c,3}$, for example, the base index p=2 to 4 is selected and the target audio may be extracted.

In other words, the point sound source is extracted by adding together the base spectrograms $\hat{G}_2$, $\hat{G}_3$, and $\hat{G}_4$, which are reconstructed from the matrix element $[Q]_{:,p}$, the matrix element $[W]_{:,p}$, and the matrix element $[H]_{:,p}$, which are represented by the base index p=2 to 4, which represents substantially the same direction as the direction of the target point sound source.

Next, description will be given of the frequency matrix W.

The frequency matrix W represents the characteristics of the frequency direction of the non-negative spectrogram G. More specifically, the frequency matrix W represents the degree of contribution of each of the total of P base spectrograms $\hat{G}_p$ to each of the K frequency bins, in other words, it represents each of the frequency characteristics of each base spectrogram $\hat{G}_p$.

For example, the base spectrogram $\hat{G}_p$ which represents the vowels of the audio has a matrix element $[W]_{:,p}$ which represents frequency characteristics in which the low-pass is emphasized, and the base spectrogram $\hat{G}_p$ which represents an affricate consonant has an element $[W]_{:,p}$ which represents frequency characteristics in which the high-pass is emphasized.

In addition, the time matrix H represents the characteristics of the time direction of the non-negative spectrogram G. More specifically, the time matrix H represents the degree of contribution of each of the P base spectrograms $\hat{G}_p$ to each of the total of L time frames, in other words, it represents each of the time characteristics of each base spectrogram $\hat{G}_p$.

For example, the base spectrogram $\hat{G}_p$ which represents the stationary environmental noise has a matrix element which represents the time characteristics in which the components of each time frame index l have equal values. In addition, if the base spectrogram $\hat{G}_p$ represents the non-stationary environmental noise, the base spectrogram $\hat{G}_p$ has a matrix element $[H]_{:,p}$ which represents the time characteristics which momentarily have a large value, in other words, it has a matrix element $[H]_{:,p}$ in which the component of a specific time frame index l is a large value.

Meanwhile, in the Non-negative Tensor Factorization (NTF), an optimized channel matrix Q, frequency matrix W and time matrix H are obtained by minimizing the cost function C in relation to the channel matrix Q, the frequency matrix W and the time matrix H, using the calculation of the following Expression (6).

$$\min_{Q,W,H} C(G \mid \hat{G}) \stackrel{def}{=} \sum_{ckl} d_\beta(g_{ckl} \mid \hat{g}_{ckl}) + \delta S(W) + \varepsilon T(H) \quad (6)$$

subject to $$Q, W, H \geq 0$$

Furthermore, in Expression (6), S(W) and T(H) are respectively the constraint functions of the cost functions C, in which the input thereof is the frequency matrix W and the time matrix H. In addition, δ and ε respectively represent the weight of the constraint function S(W) of the frequency matrix W, and the weight of the constraint function T(H) of the time matrix H. The addition of the constraint function has an effect of constraining the cost function, and affects the manner in which separation occurs. Generally, sparse constraints, smooth constraints, and the like are often used.

Furthermore, in Expression (6), $g_{ckl}$ represents the element of the non-negative spectrogram G, and $\hat{g}_{ckl}$ is a predictive value of the element $g_{ckl}$. This element a $\hat{g}_{ckl}$ is obtained using the following Expression (7). Furthermore, in Expression (7), $q_{cp}$ is an element specified using the channel index c and the base index p which configure the channel matrix Q, in other words, is the matrix element $[Q]_{c,p}$. Similarly, $w_{kp}$ is the matrix element $[W]_{k,p}$, and $h_{lp}$ is the matrix element $[H]_{l,p}$.

$$\hat{g}_{ckl} = \sum_{p=0}^{P-1} q_{cp} w_{kp} h_{lp} \quad (7)$$

Furthermore, in Expression (6), β divergence $d_\beta$ is used as an index for measuring the distance between the non-negative spectrogram G and the approximate spectrogram Ĝ, and this β divergence is represented by, for example, the following Expression (8). Furthermore, the approximate spectrogram Ĝ is the approximate value of the non-negative spectrogram G, which is obtained from the base number P of the base spectrograms $\hat{G}_p$.

$$d_\beta(x \mid y)^{def} = \begin{cases} \frac{1}{\beta(\beta-1)}(x^\beta + (\beta-1)y^\beta - \beta xy^{\beta-1}) & \beta \notin R\{0,1\} \\ x\log\frac{x}{y} - x + y & \beta = 1 \\ \frac{x}{y} - \log\frac{x}{y} - 1 & \beta = 0 \end{cases} \quad (8)$$

In other words, when β is not either 1 or 0, the β divergence is calculated using the expression shown on the uppermost side in Expression (8). In addition, when β=1, the β divergence is calculated using the expression shown in the middle of Expression (8).

Furthermore, when β=0 (Itakura-Saito distance), the β divergence is calculated using the expression shown on the lowermost side in Expression (8). In this case, the calculation shown in the following Expression (9) is performed.

$$d_0(x \mid y) = \frac{x}{y} - \log\frac{x}{y} - 1 \quad (9)$$

In addition, the differential of the β divergence $d_0(x|y)$ when β=0 is as shown in the following Expression (10).

$$d_0'(x \mid y) = \frac{1}{y} - \frac{x}{y^2} \quad (10)$$

Accordingly, the β divergence $D_o(G|\hat{G})$ in the example of Expression (6) is as shown in the following Expression (11). In addition, the partial differentials in relation to the channel matrix Q, the frequency matrix W, and the time matrix H are respectively as shown in the following Expression (12) to Expression (14), where in Expression (11) to Expression (14), subtraction, division, and logarithmic arithmetic are all calculated per element.

$$D_0(G \mid \hat{G}) = \sum_{ckl} d_0(g_{ckl} \mid \hat{g}_{ckl}) = \sum_{ckl} \frac{g_{ckl}}{\hat{g}_{ckl}} - \log\frac{g_{ckl}}{\hat{g}_{ckl}} - 1 \quad (11)$$

$$\nabla_{q_{cp}} D_0(G \mid \hat{G}) = \sum_{kl} w_{kp} h_{lp} d_0'(g_{ckl} \mid \hat{g}_{ckl}) \quad (12)$$

$$\nabla_{w_{kp}} D_0(G \mid \hat{G}) = \sum_{cl} q_{cp} h_{lp} d_0'(g_{ckl} \mid \hat{g}_{ckl}) \quad (13)$$

$$\nabla_{h_{lp}} D_0(G \mid \hat{G}) = \sum_{ck} q_{cp} w_{kp} d_0'(g_{ckl} \mid \hat{g}_{ckl}) \quad (14)$$

Next, when using the parameter θ, which simultaneously represents the channel matrix Q, the frequency matrix W, and the time matrix H, to express the updated expression of the Non-negative Tensor Factorization (NTF), this may be represented as in the following Expression (15), where in Expression (15), the symbol "·" represents multiplication per element.

$$\theta \leftarrow \theta \cdot \frac{[\nabla_\theta D_0(G \mid \hat{G})]_-}{[\nabla_\theta D_0(G \mid \hat{G})]_+} \quad (15)$$

where $$\nabla_\theta D_0(G \mid \hat{G}) = [\nabla_\theta D_0(G \mid \hat{G})]_+ - [\nabla_\theta D_0(G \mid \hat{G})]_-$$

Furthermore, in Expression (15), $[\nabla\theta D_0(G|\hat{G})]_+$ and $[\nabla\theta D_0(G|\hat{G})]_-$ respectively represent the positive portion and the negative portion of the function $\nabla\theta D_0(G|\hat{G})$.

Accordingly, the updated expressions of the Non-negative Tensor Factorization (NTF) in a case in which the constraint function of Expression (6) is not considered are the expressions shown in Expression (16) to Expression (18), where in Expression (16) to Expression (18), the factorial and division are both calculated per element.

$$Q \leftarrow Q \cdot \frac{<G/\hat{G}^2, W^\circ H>_{\{2,3\},\{1,2\}}}{<1/\hat{G}, W^\circ H>_{\{2,3\},\{1,2\}}} \quad (16)$$

$$W \leftarrow W \cdot \frac{<G/\hat{G}^2, Q^\circ H>_{\{1,3\},\{1,2\}}}{<1/\hat{G}, Q^\circ H>_{\{1,3\},\{1,2\}}} \quad (17)$$

$$H \leftarrow H \cdot \frac{<G/\hat{G}^2, Q^\circ W>_{\{1,2\},\{1,2\}}}{<1/\hat{G}, Q^\circ W>_{\{1,2\},\{1,2\}}} \quad (18)$$

Furthermore, in Expression (16) to Expression (18), "O" represents the outer product of the matrix. In addition, $<A, B>_{C,D}$ are referred to as the tensor contraction product and are represented by the following Expression (19), where in Expression (19), each character in the expression has no relation with the symbols which represent the matrices and the like which have been described above.

$$<A, B>_{\{1,\ldots,M\},\{1,\ldots,M\}} = \sum_{i_1=1}^{I_1} \cdots \sum_{i_M=1}^{I_M} a_{i_1 \ldots i_M, j_1 \ldots j_N} b_{i_1 \ldots i_M, k_1 \ldots k_P} \quad (19)$$

In the cost function C described above, in addition to the β divergence, the constraint function S(W) of the frequency matrix W, and the constraint function T(H) of the time matrix H are considered, and the respective degree of influence on the cost functions C thereof is controlled by the weights δ and ε.

In this example, a constraint function T(H) is added such that components which have a similar base index p of the time matrix H have a strong correlation to one another, and components which have a dissimilar base index p have a weak correlation to one another. This is because it is desirable to consolidate the direction of the base spectrogram $\hat{G}_p$ of sound sources of the same characteristics into a specific direction as much as possible when one of the point sound sources is factorized into several base spectrograms $\hat{G}_p$.

In addition, weights δ and ε, which are penalty control values, are, for example, δ=0, ε=0.2, and the like, however, the penalty control values may also be other values. However, since, according to the value of the penalty control value, there are cases in which one of the point sound sources is exhibited in a different location to the designated direction, it is necessary to perform determination of a value based on repeated tests.

Furthermore, for example, the constraint function S(W), the constraint function T(H), the function $\nabla_W S(W)$, and the function $\nabla_H T(H)$ are respectively the functions shown in the following Expression (20) to Expression (23).

$$S(W)=0 \quad (20)$$

$$T(H)=|B \cdot (H^T H)| \quad (21)$$

$$\nabla_W S(W)=0 \quad (22)$$

$$\nabla_H T(H)=2BH^T \quad (23)$$

Furthermore, in Expression (21), the symbol "·" represents the multiplication of elements with one another, and in Expression (21) and Expression (23), B represents a correlation control matrix, in which the size is P×P. In addition, when the diagonal component of the correlation control matrix B is 0, as the value of the off-diagonal component of the correlation control matrix B becomes further from that of the diagonal component, the value linearly approaches 1.

When the correlation between dissimilar base indexes p is strong as a result of obtaining a covariance matrix of the time matrix H and performing multiplication for each correlative control matrix B and element, a larger value is added to the cost function C, however, conversely, when the correlation between similar base indexes p is equally strong, a great value is not influenced by the cost function C. Therefore, it is learned that similar bases have characteristics that resemble those of one another.

In the example of the above described Expression (6), the updated expressions of the frequency matrix W and the time matrix H are as shown in the following Expression (24) and Expression (25) due to the introduction of a constraint function. Furthermore, there are no changes in relation to the channel matrix Q. In other words, no updating is performed.

$$W \leftarrow W \cdot \frac{<G/\hat{G}^2, Q^\circ H>_{\{1,3\},\{1,2\}} + \delta[\nabla_W S(W)]_-}{<1/\hat{G}, Q^\circ H>_{\{1,3\},\{1,2\}} + \delta[\nabla_W S(W)]_+} \quad (24)$$

$$H \leftarrow H \cdot \frac{<G/\hat{G}^2, Q^\circ W>_{\{1,2\},\{1,2\}} + \varepsilon[\nabla_H T(H)]_-}{<1/\hat{G}, Q^\circ W>_{\{1,2\},\{1,2\}} + \varepsilon[\nabla_H T(H)]_+} \quad (25)$$

In this manner, the updating of the channel matrix Q is not performed, and only the updating of the frequency matrix W and the time matrix H is performed.

In addition, in the sound source factorization unit 62, as shown in FIG. 6, initialization is performed so as to maintain an equal distance between each adjacent element of the channel matrix Q. For example, in the case of two channel stereo and base number P=3, element $[Q]_{:,0}=[0.0, 1.0]^T$, element $[Q]_{:,1}=[0.5, 0.5]^T$, element $[Q]_{:,2}=[1.0, 0.0]^T$, and the like. At this time, extra elements $[Q]_{:,p}$ are allocated in the direction which indicates the direction specification information q which is subsequently determined. For example, when the direction designated by the user is the forward, elements p to p+np are set to be $[Q]_{:,p}=[0.5,0.5]^t$. As a result, there is an effect where a number of elements of the frequency matrix W and the time matrix H are learned with regard to the forward direction. In the Examples, np=3 is set, however, the value may be changed according to the sound source.

Furthermore, description was given that initialization of the channel matrix Q is performed so as to maintain an equal distance between each adjacent element, however, the values of elements may also be the same as one another, or be arranged arbitrarily. In addition, in both of the frequency matrix W and the time matrix H, initialization is performed using a random non-negative value, however, a user may also designate an arbitrary value.

Meanwhile, by performing minimization of the cost function C of Expression (6) while updating the frequency matrix W and the time matrix H using Expression (24) and Expression (25), the sound source factorization unit 62 obtains the optimized channel matrix Q, frequency matrix W, and time matrix H.

Furthermore, in addition to the obtained channel matrix Q being supplied to the direction specification unit 63 from the sound source factorization unit 62, the channel matrix Q, the frequency matrix W, and the time matrix H are supplied from the sound source factorization unit 62 to the sound source amplification unit 64.

Relating to Direction Specification Unit

Next, description will be given of the direction specification unit 63.

In the direction specification unit 63, the direction of the sound source to be amplified in a space, in which the axial directions are the respective channel directions, is specified based on the supplied direction information u corresponding to the designated direction, which is designated by the user, and the channel matrix Q, which is supplied from the sound source factorization unit 62. In other words, the direction specification information q is obtained.

For example, the direction information u is provided in an equivalent format to the element $[Q]_{:,p}$ of the channel matrix Q, in the form of a weight to each channel, however, the format of the direction information u may also be another format. For example, in the case of two channel stereo, the direction information u is a column vector formed from two elements, and is provided as $u=[0.9, 0.1]^T$.

The direction specification unit 63 calculates the direction specification information q by calculating the following Expression (26) based on the direction information u and the element $[Q]_{:,p}$ of the channel matrix Q.

$$q \leftarrow \underset{p}{\mathrm{argmin}}([Q]_{:,p} - u)^2 \qquad (26)$$

In Expression (26), the square distance of the direction information u and the element $[Q]_{:,p}$ is obtained, and among each of P elements $[Q]_{:,p}$, the value of the base index p of an element $[Q]_{:,p}$ in which the square distance with the direction information u is a minimum is the value of the direction specification information q.

For example, when the total number of channels C is 2, the square distance between the vector represented by the direction information u and the vector $[Q]_{:,p}$, which is each element $[Q]_{:,p}$, is compared as shown in FIG. 7. Furthermore, in FIG. 7, the vertical axis and the horizontal axis represent the components of the channel 1 and the channel 2. In this example, channel 1 is the left channel and channel 2 is the right channel.

In FIG. 7, the vector VC21-1 to the vector VC21-(P−1) represented by arrows represent the vector $[Q]_{c,0}$ to the vector $[Q]_{c,P-1}$, and the vector VC22 represented by the arrow represents a vector represented by the direction information u. Furthermore, hereinafter, when there is no particular reason to distinguish between the vector VC21-1 and the vector VC21-(P−1), they will simply be referred to as the vectors VC21.

When the direction information u represented by the arrow R41 is supplied to the direction specification unit 63, the direction information u is projected onto space, in which each channel direction is the axial direction, and is set as the vector VC22. Furthermore, the distance between each vector VC21 and the vector VC22 is compared and the direction specification information q is obtained.

In this example, the distance from the vector VC22 is minimum when the vector VC21-q. In other words, when vector $[Q]_{c,q}$, therefore, the base index p=q of this vector $[Q]_{c,q}$ is the value of the direction specification information q.

The direction specification information q obtained in this manner is supplied from the direction specification unit 63 to the sound source amplification unit 64.

Furthermore, here, a case in which the square distance of each element $[Q]_{:,p}$ of the channel matrix Q and the direction information u is measured, and the base index of the element $[Q]_{:,p}$ in which the square distance is a minimum is the direction specification information q, however, the distance of each element $[Q]_{:,p}$ and the direction information u is not limited to the square distance and may also be another distance. In addition, this is not limited to the square distance and the like, and the direction specification information q may also be calculated by obtaining the degree of approximation with the direction information u using an approximation degree calculation.

Relating to Sound Source Amplification Unit

Further description will be given of the sound source amplification unit 64.

In the sound source amplification unit 64, amplification of the positive of the signal of the designated direction and the adjacent directions thereof, and amplification of the negative of the signal of other directions is performed based on the channel matrix Q, the frequency matrix W, and the time matrix H supplied from the sound source factorization unit 62, the direction specification information q supplied from the direction specification unit 63, and the input complex spectrogram X supplied from the time-frequency transform unit 61.

More specifically, the sound source amplification unit 64 obtains an output complex spectrogram Y in which the output time-frequency spectrum Y(c, k, l) is expressed as a three-dimensional tensor by performing the calculation of the following expression (27).

$$Y = \frac{\sum_{p=0}^{P-1} A_p \cdot \hat{G}_p}{\hat{G}} \cdot X \qquad (27)$$

The output complex spectrogram Y is obtained by concatenating the output time-frequency spectrum Y(c, k, l) into the channel direction, the time frame direction, and the frequency direction. Similarly, the input complex spectrogram X is also obtained by expressing the input complex spectrum X(c, k, l) as a three-dimensional tensor.

In addition, in Expression (27), the symbol "·" represents multiplication of the elements with one another. Furthermore, the element $A_p$ is a tensor formed from elements relating to the base index p of a four-dimensional amplification factor tensor A of C×K×L×P. Furthermore, hereinafter, the value of a tensor formed from elements relating to the time frame index l and the base index p of the amplification factor tensor A will also be referred to as the value of the amplification factor tensor $[A]_{:,:,l,p}$.

Since the tensor $A_p$ is the weight of each base index p, in other words, the amplification factor, in the calculation of Expression (27), each input complex spectrum X(c, k, l) is amplified according to the base index p.

For example, when the value of the direction specification information is q, when the value of the amplification factor tensor $[A]_{:,:,l,p}$ becomes greater in accordance with the passage of time when the base index p=q, in other words, becomes greater as the value of the time frame index l becomes greater.

In addition, when the base index p is a direction dissimilar to the direction specification information q, in other words, when the difference between the base index p and the direction specification information q is great, the value of the amplification factor tensor $[A]_{:,:,l,p}$ becomes smaller according to the passage of time.

Accordingly, the input complex spectrogram X of an element similar to the base index p=q is amplified positively, and the input complex spectrogram X of dissimilar element is amplified negatively. Furthermore, if the value of the amplification factor tensor $[A]_{:,:,l,p}$ is fixed regardless of the value of the time frame index l, only the audio from the sound source in the designated direction determined by the direction specification information q is extracted.

In addition, for example, the value of the amplification factor tensor $[A]_{:,:,0,q}$ is +0 dB and the amplification factor tensor $[A]_{:,:,1,q}$, may be supplemented such that the value of the amplification factor tensor $[A]_{:,:,1,q}$ is +4 dB, and may also be another value. Furthermore, the value of the amplification factor tensor $[A]_{:,:,l,p}$ may linearly decrease 1 dB at a time as the base index p becomes less similar to the direction specification information q, and may also be another value.

Furthermore, according to an embodiment of the present technology, it is also possible to separate the audio from a plurality of sound sources in the same direction.

For example, when an element $[W]_{:,p}$ which represents the frequency characteristics or an element $[H]_{:,p}$ which represents the time characteristics which clearly differ from those of the desired sound source has been learned, only the desired sound source may be extracted by setting all of the elements of the amplification factor tensor $[A]_{:,:,:,p}$ which corresponds to the base index p thereof to 0. Specifically, for example, in the sound source amplification unit 64, as shown in the following Expression (28), when the dispersion of the matrix element $[H]_{:,p}$ of the time matrix H is thre_H or less, the noise is assumed to be stationary and all of the elements of the amplification factor tensor $[A]_{:,:,:,p}$ are set to 0. Furthermore, for example, set to thre_H=100.

Specifically, the frequency-time transform unit 65 calculates the multichannel output frame signal y'(c, n, l) by calculating the following Expression (29) and Expression (30) based on the output time-frequency spectrum Y(c, k, l).

$$Y'(c, k, l) = \begin{cases} Y(c, k, l) & k = 0, \ldots, \frac{M}{2} \\ conj\,(Y(c, M-k, l)) & k = \frac{M}{2}+1, \ldots, M-1 \end{cases} \quad (29)$$

$$y'(c, n, l) = \frac{1}{M} \sum_{k=0}^{M-1} Y'(c, k, l) \times \exp\left(j 2\pi \frac{n \times k}{M}\right) \quad (30)$$

Furthermore, the frequency-time transform unit 65 performs the frame synthesis by multiplying the window function $w_{syn}(n)$ shown in the following Expression (31) by the obtained multichannel output frame signal y'(c, n, l), and performing the Overlap-Add shown in Expression (32).

$$W_{syn}(n) = \begin{cases} \left(0.5 - 0.5 \times \cos\left(2\pi\frac{n}{N}\right)\right)^{0.5} & n = 0, \ldots, N-1 \\ 0 & n = N, \ldots, M-1 \end{cases} \quad (31)$$

$$y^{curr}(c, n+l\times N) = y'(c, n, l) \times W_{syn}(n) + y^{prev}(c, n+l\times N) \quad (32)$$

In the Overlap-Add of Expression (32), the multichannel output frame signal y'(c, n, l) by which the window function $$\begin{cases} [A]:,\,:,\,:,_p = [A]:,\,:,\,:,_p & \sum_{l=0}^{L-1}\left\{(H)_{l,p} - \sum_{ll=0}^{L-1}[H]_{ll,l}/L\right\}^2 / L \geq \text{thre\_H} \\ [A]:,\,:,\,:,_p = 0 & \sum_{l=0}^{L-1}\left([H]_{l,p} - \sum_{ll=0}^{L-1}[H]_{ll,p}/L\right)^2 / L < \text{thre\_H} \end{cases} \quad (28)$$

The sound source amplification unit 64 distinguishes sound sources present in the same direction using the statistical characteristics of the frequency matrix W or the time matrix H, and appropriately determines (changes) the values of the elements of the amplification factor tensor $[A]_{:,:,:,p}$. Accordingly, only the audio of the desired sound source may be extracted from among sound sources in the same direction.

As described above, by performing the calculation of Expression (27), the sound source amplification unit 64 amplifies the audio from a sound source in the designated direction in addition to attenuating the audio from sound sources in other directions, and supplies the output complex spectrogram Y obtained as a result, in other words, the output time-frequency spectrum Y(c, k, l) to the frequency-time transform unit 65.

Relating to Frequency-Time Transform Unit

In the frequency-time transform unit 65, the frequency-time transformation of the output time-frequency spectrum Y(c, k, l) supplied from the sound source amplification unit 64 is performed, and the multichannel output signal y(c, t) output to the earphone 23 is generated.

Furthermore, here, description is given of a case in which an inverse discrete Fourier transform (IDFT) is used, however, if a transform equivalent to the inverse transform of the transformation performed by the time-frequency transform unit 61 is performed, any type of transform may be used.

$w_{syn}(n)$ is multiplied is added to the multichannel output signal $y^{prev}(c, n+l\times N)$, which is the multichannel output signal y(c, n+l×N) before updating. Furthermore, the multichannel output signal $y^{curr}(c, n+l\times N)$ obtained as a result is newly the multichannel output signal y(c, n+l×N) after updating. In this manner, in relation to the multichannel output signal y(c, n+l×N), the multichannel output frame signal of each frame is added, and finally, the multichannel output signal y(c, n+l×N) is obtained.

The frequency-time transform unit 65 outputs the finally obtained multichannel output signal y(c, n+l×N) to the earphone 23 as a multichannel output signal y(c, t).

Furthermore, in Expression (31), as the window function $w_{syn}(n)$, a window function which is the same as the window function $w_{ana}(n)$ used in the time-frequency transform unit 61 is used, however, when the window function used in the time-frequency transform unit 61 is another window such as a Hamming window, a rectangular window may also be used as the window function $w_{syn}(n)$.

Description of Sound Source Amplification Processing

Next, description will be given of the sound source amplification processing performed by the direction designated audio amplifier 51 with reference to the flowchart of FIG. 8. This sound source amplification processing is initiated when the multichannel input signal is supplied to the time-frequency transform unit 61 and the direction information u is supplied to the direction specification unit 63.

In the step S11, the time-frequency transform unit 61 obtains the window function applied signal wx(c, n, l) by performing time frame division on the multichannel input signal x(c, t) supplied from the microphone 22, and multiplying the multichannel frame signal obtained as a result by the window function. For example, the window function applied signal wx(c, n, l) is calculated using the calculation in Expression (1).

In step S12, the time-frequency transform unit 61 calculates the input complex spectra X(c, k, l), by performing a time-frequency transformation on the window function applied signal wx(c, n, l), and supplies the input complex spectrogram X formed from the input complex spectra X(c, k, l) to the sound source amplification unit 64. For example, the calculations of Expression (3) and Expression (4) are performed, and the input complex spectra X(c, k, l) are calculated.

In step S13, the time-frequency transform unit 61 makes the input complex spectra X(c, k, l) non-negative, and supplies the non-negative spectrogram G formed from the obtained non-negative spectra G(c, k, l) to the sound source factorization unit 62. For example, the calculation of Expression (5) is performed, and the non-negative spectra G(c, k, l) are calculated.

In step S14, the sound source factorization unit 62 performs optimization of the channel matrix Q, the frequency matrix W, and the time matrix H by minimizing the cost function C based on the non-negative spectrogram G supplied from the time-frequency transform unit 61.

For example, by performing minimization of the cost function C shown in Expression (6) while performing matrix updating using the updated expression shown in Expression (24) and Expression (25), the sound source factorization unit 62 obtains the channel matrix Q, the frequency matrix W, and the time matrix H using tensor factorization.

Furthermore, in the sound source factorization unit 62, in addition to the obtained channel matrix Q being supplied to the direction specification unit 63, the channel matrix Q, the frequency matrix W, and the time matrix H are supplied to the sound source amplification unit 64.

In step S15, based on the supplied direction information u and the channel matrix Q supplied from the sound source factorization unit 62, the direction specification unit 63 obtains the direction specification information q, and supplies the direction specification information q to the sound source amplification unit 64. For example, the calculation of Expression (26) is performed, and the direction specification information q is obtained.

In step S16, based on the input complex spectrum X from the time-frequency transform unit 61, the channel matrix Q, the frequency matrix W, and the time matrix H from the sound source factorization unit 62, the sound source amplification unit 64 amplifies the audio from the direction determined according to the direction specification information q from the direction specification unit 63.

For example, by performing the calculation of Expression (27), the sound source amplification unit 64 amplifies the audio from the designated direction in addition to attenuating the audio from directions which are different to the designated direction, and supplies the output time-frequency spectrum Y(c, k, l) obtained as a result to the frequency-time transform unit 65.

In step S17, the frequency-time transform unit 65 performs the frequency-time transformation on the output time-frequency spectrum Y(c, k, l) supplied from the sound source amplification unit 64. For example, the calculations of Expression (29) and Expression (30) are performed, and the multichannel output frame signal y'(c, n, l) is calculated.

In step S18, the frequency-time transform unit 65 performs frame synthesis by multiplying the multichannel output frame signal y'(c, n, l) by the window function and performing the Overlap-Add, outputs the multichannel output signal y(c, t) to the earphone 23, and the sound source amplification processing finishes. For example, the calculation of Expression (32) is performed, and the multichannel output signal y(c,t) is calculated.

In the above described manner, the direction designated audio amplifier 51 factorizes the non-negative spectrogram into the channel matrix Q, the frequency matrix W, and the time matrix H using tensor factorization. Furthermore, the direction designated audio amplifier 51 amplifies a component specified from the channel matrix Q and the direction information u as the audio from a sound source in the desired direction.

It is possible to extract the audio from a sound source in a desired direction easily without specialized equipment being necessary by specifying an audio component from a sound source in a desired direction using the channel matrix Q obtained by performing tensor factorization on the non-negative spectrogram in this manner.

Meanwhile, the series of processes described above may be executed using hardware, and may also be executed using software. When the series of processes is executed using software, a program which configures the software is installed on the computer. Here, the term computer includes, for example, a computer embedded in dedicated hardware, an ordinary personal computer in which it is possible to execute various functions by installing various programs thereon, or the like.

FIG. 9 is a block diagram showing an example of the configuration of the hardware of a computer which executes the series of processes described above using a program.

In the computer, the CPU (Central Processing Unit) 201, the ROM (Read Only Memory) 202, and the RAM (Random Access Memory) 203 are connected to one another via the bus 204.

An input output interface 205 is further connected to the bus 204. An input unit 206, an output unit 207, a storage unit 208, a communication unit 209, and a drive 210 are connected to the input output interface 205.

The input unit 206 is formed from a keyboard, a mouse, a microphone, an imaging device, or the like. The output unit 207 is formed from a display, a speaker, and the like. The storage unit 208 is formed from a hard disk, non-volatile memory, or the like. The communication unit 209 is formed from a network interface or the like. The drive 210 drives removable media 211 such as a magnetic disk, an optical disc, a magneto-optical disc, or solid state memory.

In the computer configured as described above, the CPU 201, for example, performs the above described series of processes by loading the program stored in the storage unit 208 into the RAM 203 via the input output interface 205 and the bus 204 and performing execution.

The program executed by the computer (CPU 201), for example, may be provided stored on the removable media 211 as packaged media or the like. In addition, the program may be provided via a wired or wireless transmission medium such as a local area network, the Internet, or digital satellite broadcast.

In the computer, it is possible to install the program onto the storage unit 208 via the input output interface 205 by inserting the removable media 211 into the drive 210. In addition, the program may be received by the communication unit 209 via a wired or wireless transmission medium and installed to the storage unit 208. It is also possible to install the program to the ROM 202 or the storage unit 208 in advance.

Furthermore, the program executed by the computer may be a program in which processing is performed in time series in the order described in the present specification, and may also be a program in which processing is performed in parallel, or, at a necessary timing such as when a call is performed.

In addition, the embodiments of the present technology are not limited to the above described embodiments, and various modifications carried out in a range not departing from the spirit of the present technology may be made.

For example, the present technology may adopt a cloud computing configuration in which one function is shared by a plurality of devices via a network, and processing is performed in collaboration.

In addition, each step described in the above described flowchart may, in addition to being executed on one device, be shared by a plurality of devices and executed.

Furthermore, when a plurality of processes is included in one step, the plurality of processes included in the one step may, in addition to being executed on one device, be shared by a plurality of devices and executed.

Furthermore, it is also possible for the present technology to adopt the following configurations.

(1) An audio processing device including a factorization unit which factorizes frequency information obtained by performing time-frequency transformation on an audio signal from a plurality of channels into a channel matrix representing characteristics of a channel direction, a frequency matrix representing characteristics of a frequency direction, and a time matrix representing characteristics of a time direction; and an extraction unit which extracts the frequency information of audio from an arbitrary designated direction based on the channel matrix, the frequency matrix, and the time matrix.

(2) The audio processing device according to (1), further including a direction specification unit which obtains direction specification information specifying a matrix component relating to audio from the designated direction based on direction information and the channel matrix representing the designated direction; in which the extraction unit extracts the frequency information of audio from the designated direction based on the channel matrix, the frequency matrix, as well as the time matrix and the direction specification information.

(3) The audio processing device according to (2), in which the extraction unit extracts the frequency information of audio from the designated direction by amplifying the frequency information by an amplification factor determined using the direction specification information.

(4) The audio processing device according to (3), in which the extraction unit changes the amplification factor based on statistical characteristics of the frequency matrix or the time matrix.

(5) The audio processing device according to any one of (1) to (4), in which the factorization unit assumes that the frequency information is a three-dimensional tensor where a channel, a frequency, and a time frame are respective dimensions, and factorizes the frequency information into the channel matrix, the frequency matrix, and the time matrix by performing tensor factorization.

(6) The audio processing device according to (5), in which the tensor factorization is a non-negative tensor factorization.

(7) The audio processing device according to any one of (1) to (6), further including a frequency-time transform unit which generates an audio signal from a plurality of channels by performing frequency-time transformation on the frequency information of audio from the designated direction obtained by the extraction unit.

It should be understood by those skilled in the art that various modifications, combinations, sub-combinations and alterations may occur depending on design requirements and other factors insofar as they are within the scope of the appended claims or the equivalents thereof.

What is claimed is:

1. An audio processing device comprising:
   circuitry configured to:
   factorize frequency information obtained by performing time-frequency transformation on an audio signal from a plurality of channels into a channel matrix representing characteristics of a channel direction, a frequency matrix representing characteristics of a frequency direction, and a time matrix representing characteristics of a time direction;
   obtain direction specification information specifying a matrix component relating to audio from a designated direction based on direction information of the designated direction and the channel matrix representing the designated direction;
   determine a direction specific amplification factor using the direction specification information; and
   extract the frequency information of audio from the designated direction based on the channel matrix, the frequency matrix, the time matrix, and the direction specification information by amplifying the frequency information by the direction specific amplification factor.

2. The audio processing device according to claim 1, wherein the circuitry changes the direction specific amplification factor based on statistical characteristics of the frequency matrix or the time matrix.

3. The audio processing device according to claim 2, wherein the circuitry assumes that the frequency information is a three-dimensional tensor where a channel, a frequency, and a time frame are respective dimensions, and factorizes the frequency information into the channel matrix, the frequency matrix, and the time matrix by performing tensor factorization.

4. The audio processing device according to claim 3, wherein the tensor factorization is a non-negative tensor factorization.

5. The audio processing device according to claim 4, wherein the circuitry generates an audio signal from a plurality of channels by performing frequency-time transformation on the frequency information of audio from the designated direction obtained by the circuitry.

6. The audio processing device according to claim 1, wherein an initial value of the channel matrix is determined based on the direction specification information.

7. An audio processing method comprising:
   factorizing frequency information obtained by performing time-frequency transformation on an audio signal from a plurality of channels into a channel matrix representing characteristics of a channel direction, a frequency matrix representing characteristics of a frequency direction, and a time matrix representing characteristics of a time direction;
   obtaining direction specification information specifying a matrix component relating to audio from a designated direction based on direction information of the designated direction and the channel matrix representing the designated direction;
   determining a direction specific amplification factor using the direction specification information; and extracting, using circuitry, the frequency information of audio from the designated direction based on the channel matrix, the frequency matrix, the time matrix, and the direction specification information by amplifying the frequency information by the direction specific amplification factor.

8. A non-transitory computer readable medium including executable instructions, which when executed by a computer cause the computer to execute an audio processing method comprising:

factorizing frequency information obtained by performing time-frequency transformation on an audio signal from a plurality of channels into a channel matrix representing characteristics of a channel direction, a frequency matrix representing characteristics of a frequency direction, and a time matrix representing characteristics of a time direction;

obtaining direction specification information specifying a matrix component relating to audio from a designated direction based on direction information of the designated direction and the channel matrix representing the designated direction;

determining a direction specific amplification factor using the direction specification information; and extracting the frequency information of audio from the designated direction based on the channel matrix, the frequency matrix, the time matrix, and the direction specification information by amplifying the frequency information by the direction specific amplification factor.

* * * * *